United States Patent
Somerville Roberts et al.

(10) Patent No.: US 10,501,711 B2
(45) Date of Patent: Dec. 10, 2019

(54) WATER-SOLUBLE UNIT DOSE ARTICLE COMPRISING A SOLID LAUNDRY DETERGENT COMPOSITION

(71) Applicant: The Procter & Gamble Company, Cincinnati, OH (US)

(72) Inventors: Nigel Patrick Somerville Roberts, Northumberland (GB); Alan Thomas Brooker, Newcastle upon Tyne (GB); Carly Pickering, Tyne & Wear (GB); Ned Peter Buijs, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/005,724

(22) Filed: Jun. 12, 2018

(65) Prior Publication Data

US 2018/0362903 A1 Dec. 20, 2018

(30) Foreign Application Priority Data

Jun. 15, 2017 (EP) .................... 17176223

(51) Int. Cl.
| | | |
|---|---|---|
| *C11D 17/00* | (2006.01) |
| *C11D 17/04* | (2006.01) |
| *C08L 29/04* | (2006.01) |
| *C11D 1/14* | (2006.01) |
| *C11D 1/66* | (2006.01) |
| *C11D 3/04* | (2006.01) |
| *C11D 3/12* | (2006.01) |
| *C11D 3/22* | (2006.01) |
| *C11D 3/37* | (2006.01) |
| *C11D 3/42* | (2006.01) |
| *C11D 3/50* | (2006.01) |
| *C11D 11/00* | (2006.01) |
| *C11D 11/02* | (2006.01) |

(52) U.S. Cl.
CPC .......... *C11D 17/045* (2013.01); *C08L 29/04* (2013.01); *C11D 1/143* (2013.01); *C11D 1/146* (2013.01); *C11D 1/66* (2013.01); *C11D 3/046* (2013.01); *C11D 3/124* (2013.01); *C11D 3/222* (2013.01); *C11D 3/3715* (2013.01); *C11D 3/3723* (2013.01); *C11D 3/3792* (2013.01); *C11D 3/42* (2013.01); *C11D 3/505* (2013.01); *C11D 11/0017* (2013.01); *C11D 11/02* (2013.01); *C11D 17/043* (2013.01); *C11D 17/044* (2013.01); *C08L 2203/16* (2013.01)

(58) Field of Classification Search
CPC ..... C11D 17/004; C11D 7/045; C11D 3/3753; C11D 3/126; C11D 11/0017; C11D 17/0065; C11D 3/08; C11D 1/00; C11D 1/02; C11D 10/042; C11D 13/04; C11D 3/3761; C11D 1/002
See application file for complete search history.

(56) References Cited

U.S. PATENT DOCUMENTS

| | | |
|---|---|---|
| 5,132,036 A | 7/1992 | Falou et al. |
| 6,878,679 B2 | 4/2005 | Sommerville-Roberts et al. |
| 7,386,971 B2 | 6/2008 | Catlin et al. |
| 7,595,290 B2 | 9/2009 | Pounds et al. |
| 2003/0087784 A1 | 5/2003 | Somervile-Roberts et al. |
| 2005/0229260 A1 | 10/2005 | Feichtinger et al. |
| 2009/0011970 A1 | 1/2009 | Evers |
| 2015/0267155 A1* | 9/2015 | Brooker ............... C11D 17/045 8/137 |
| 2015/0275157 A1 | 10/2015 | Souter et al. |
| 2016/0040105 A1* | 2/2016 | Depoot .................. C11D 1/66 510/296 |
| 2016/0177236 A1 | 6/2016 | Brooker et al. |
| 2018/0094212 A1 | 4/2018 | Chieffi et al. |
| 2018/0094215 A1 | 4/2018 | Chieffi et al. |
| 2018/0094219 A1 | 4/2018 | Chieffi et al. |
| 2018/0094220 A1 | 4/2018 | Chieffi et al. |
| 2018/0094221 A1 | 4/2018 | Chieffi et al. |
| 2018/0094222 A1 | 4/2018 | Chieffi et al. |
| 2018/0094223 A1 | 4/2018 | Chieffi et al. |
| 2018/0094224 A1 | 4/2018 | Chieffi et al. |
| 2018/0094225 A1 | 4/2018 | Chieffi et al. |
| 2018/0094228 A1 | 4/2018 | Chieffi et al. |

FOREIGN PATENT DOCUMENTS

| | | |
|---|---|---|
| EP | 3301145 A1 | 4/2018 |
| EP | 3301146 A1 | 4/2018 |
| EP | 3301147 A1 | 4/2018 |
| EP | 3301148 A1 | 4/2018 |
| EP | 3301149 A1 | 4/2018 |
| EP | 3301158 A1 | 4/2018 |
| EP | 3301160 A1 | 4/2018 |
| EP | 3301161 A1 | 4/2018 |
| EP | 3301169 A1 | 4/2018 |

OTHER PUBLICATIONS

Search Report for application No. 17176223.0-1358, dated Nov. 27, 2017, 12 pages.
Search Report foe application No. 17176195.0-1358, dated Dec. 13, 2017, 7 pages.
U.S. Appl. No. 16/005,723, filed Jun. 12, 2018, Nigel Patrick Someville Roberts.
U.S. Appl. No. 16/005,726, filed Jun. 12, 2018, Nigel Patrick Someville Roberts.

* cited by examiner

*Primary Examiner* — Eisa B Elhilo
(74) *Attorney, Agent, or Firm* — Gregory S. Darley-Emerson

(57) ABSTRACT

Water-soluble unit dose article containing solid laundry detergent composition and water-soluble film.

21 Claims, No Drawings

WATER-SOLUBLE UNIT DOSE ARTICLE COMPRISING A SOLID LAUNDRY DETERGENT COMPOSITION

FIELD OF THE INVENTION

The present invention relates to water-soluble unit dose articles containing solid laundry detergent compositions and methods of using them.

BACKGROUND OF THE INVENTION

Water-soluble laundry unit dose articles are known and are liked by consumers due to their ease and efficiency of use in the laundry operation. Water-soluble unit dose articles comprise water-soluble film defining at least one internal compartment. A laundry detergent composition is housed within the internal compartment. Upon exposure to water, the water-soluble film dissolves/disintegrates releasing the laundry detergent composition into the surrounding water. The laundry detergent composition may be a solid laundry detergent composition. Such detergent compositions comprise non-soap anionic surfactants as the primary cleaning active and may comprise other common detergent ingredients.

Due to their compact form, water-soluble unit dose articles have limited space for formulating the solid laundry detergent compositions. This can result in lower than desired cleaning performance as extra detergent composition cannot simply be added to compensate for any under-performance. Addition of further detergent composition to the water-soluble unit dose article would require making the unit dose article bigger making it less convenient and also could contribute to negatives such as impaired dissolution when additional water soluble film would be required to accommodate the bigger water soluble unit dose article and/or reduced structural stability of the unit dose article especially when further stretching the original water soluble film to accommodate the bigger water soluble unit dose article (the film may not provide sufficient structural stability for the volume of solid detergent composition added).

Therefore, there is a need in the art to provide improved performance of said water-soluble unit dose articles without addition of increased levels of solid laundry detergent composition to the unit dose articles.

It was surprisingly found a water-soluble unit dose article comprising a solid laundry detergent composition having a particular pH (upon dilution of the solid laundry detergent composition) provided improved performance as compared to water-soluble unit dose articles having a solid laundry detergent composition having a higher pH (upon dilution of the solid laundry detergent composition) as is known in the art.

SUMMARY OF THE INVENTION

A first aspect of the present invention is a water-soluble unit dose article comprising a water-soluble film and a solid laundry detergent composition, wherein the water-soluble film defines a first internal compartment; and
wherein the solid laundry detergent composition is comprised within the first internal compartment; and
wherein the solid composition comprises a non-soap anionic surfactant; and
wherein the solid composition at 1 wt % dilution in deionized water at 20° C. has an equilibrium pH in the range of from 6.5 to 8.8.

A second aspect of the present invention is a method of washing comprising the steps of adding the water-soluble unit dose article according to the present invention to sufficient water to dilute the solid laundry detergent composition by a factor of at least 300 fold to create a wash liquor and contacting fabrics to be washed with said wash liquor.

A third aspect of the present invention is the use of a solid laundry detergent composition comprising a non-soap anionic surfactant and having at 1 wt % dilution in deionized water at 20° C. an equilibrium pH in the range of from 6.5 to 8.8 in a water-soluble unit dose article to improve fabric treatment performance of said water-soluble unit dose article.

DETAILED DESCRIPTION OF THE INVENTION

Water-Soluble Unit Dose Article

The present invention is to a water-soluble unit dose article comprising a water-soluble film and a solid laundry detergent composition.

The water-soluble film is described in more detail below.

The solid laundry detergent composition is described in more detail below.

The water-soluble unit dose article comprises the water-soluble film shaped such that the unit-dose article comprises at least a first internal compartment surrounded by the water-soluble film. The compartment should be understood as meaning a closed internal space within the unit dose article, which holds the solid laundry detergent composition. The unit dose article may comprise a first water-soluble film and a second water-soluble film sealed to one another such to define the internal compartment. The water-soluble unit dose article is constructed such that the solid laundry detergent composition is comprised within the first internal compartment. The water-soluble unit dose article is constructed such that the solid laundry detergent composition does not leak out of the compartment during storage. However, upon addition of the water-soluble unit dose article to water, the water-soluble film dissolves and releases the contents of the internal compartment into the wash liquor.

During manufacture, a first water-soluble film may be shaped to comprise an open compartment into which the solid laundry detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments. The compartments may be arranged in superposed orientation, i.e. one positioned on top of the other. In such an orientation, the unit dose article will comprise at least three films, top, middle and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment, but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments.

Each compartment may comprise the same or different compositions. The different compositions could all be in the same form, or they may be in different forms.

The water-soluble unit dose article may comprise at least a first compartment and a second compartment, preferably at least a first compartment, a second compartment and a third compartment. Preferably, the compartments are arranged in a side-by-side arrangement, a superposed arrangement or a mixture thereof. Preferably, at least the second compartment, more preferably at least the second compartment and the third compartment are superposed onto the first compartment. The second compartment and the third compartment are preferably arranged in a side-by-side arrangement superposed onto the first compartment.

The first i.e. bottom compartment preferably comprises the free flowing solid detergent composition. The second and subsequent compartments i.e. superposed compartments comprise a liquid, a solid or a mixture thereof, preferably a liquid. All compartments might comprise a gas in addition to the enclosed compositions, preferably will comprise a gas. Without wishing to be bound by theory, such a gas will create an 'air space' in the compartment and will facilitate free flowing of the enclosed compositions, and furthermore can act as an additional barrier against eventual compartment to compartment active migration through the film. Preferably the gas is air. Further this particular design can also enable the use of a thinner water soluble film orientated between the bottom and the subsequent superposed compartments of the water soluble unit dose article. Such thinner film is preferred for reduced manufacturing use of material, environmental exposure and residue on fabric risk reduction at the end of the wash process.

Water-Soluble Film

The film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Mixtures of polymers and/or copolymers can also be used as the pouch material, especially mixtures of polyvinylalcohol polymers and/or copolymers, especially mixtures of polyvinylalcohol homopolymers and/or anionic polyvinylalcohol copolymers preferably selected from sulphonated and carboxylated anionic polyvinylalcohol copolymers especially carboxylated anionic polyvinylalcohol copolymers. Most preferably the water soluble film comprises a blend of a polyvinylalcohol homopolymer and a carboxylated anionic polyvinylalcohol copolymer.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M8310.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Solid Laundry Detergent Composition

The first internal compartment comprises a solid laundry detergent composition. The solid laundry detergent composition may comprise solid particulates or may be a single homogenous solid. Preferably, the solid laundry detergent composition comprises particles. This means the solid laundry detergent composition comprises individual solid particles as opposed to the solid being a single homogenous solid. The particles may be free-flowing or may be compacted, preferably free-flowing.

The particles may be spray-dried particles, agglomerates, extrudates or a mixture thereof. Those skilled in the art will know how to make spray-dried particles, agglomerates or extrudates using techniques commonly known in the art.

The solid particulate laundry detergent composition preferably has a mean particle size of between 400 microns and 1000 microns, more preferably between 450 microns and 850 microns.

Preferably, the solid particulate laundry detergent composition has a bulk density of between 400 and 1000 g/l, more preferably between 500 and 800 g/l, as measured through ISO 697 test method.

Preferably, the solid particulate laundry detergent composition fills between 25% and 95%, preferably between 30% and 90%, more preferably between 40% and 80% of the available volume within the first compartment, the remaining volume preferably filled with a gas. The gas may be any suitable gas. The gas may comprise oxygen, nitrogen, carbon dioxide or a mixture thereof. The gas may be air.

The first compartment preferably comprises between 1 g and 25 g, preferably between 5 g and 20 g, more preferably between 8 g and 18 g of the solid particulate laundry composition.

The solid particulate laundry detergent composition preferably is free flowing within the first internal compartment. That is to say if the water-soluble unit dose article is moved or repositioned, the solid particulate laundry detergent composition can be seen to freely move, or flow within the first internal compartment. This is opposed to where the solid particulate laundry detergent composition is compressed such as happens when excess air is drawn out of the first internal compartment so that the film contracts and compresses around the solid particulate laundry detergent composition. Such water-soluble unit dose articles comprising compressed solids are commonly known from the art.

The solid composition comprises a non-soap anionic surfactant, preferably, the solid laundry detergent composition comprises between 20% and 75%, more preferably between 30% and 70%, most preferably between 40% and 60% by weight of the solid laundry detergent composition of the non-soap anionic surfactant.

Preferably, the non-soap anionic surfactant comprises linear alkylbenzene sulphonate, alkoxylated alkyl sulphate or a mixture thereof, more preferably a mixture thereof. Preferably, the ratio of linear alkylbenzene sulphonate to alkoxylated alkyl sulphate preferably the ratio of linear alkylbenzene sulphonate to ethoxylated alkyl sulphate is from 1:2 to 20:1, preferably from 1.1:1 to 15:1, more preferably from 1.2:1 to 10:1, even more preferably from 1.3:1 to 5:1, even more preferably from 1.4:1 to 3:1, most preferably from 2:1 to 3:1.

Preferably, the alkoxylated alkyl sulphate is an ethoxylated alkyl sulphate with an average degree of ethoxylation of between 0.5 and 7, preferably between 0.5 and 5, more preferably between 0.5 and 3, even more preferably from 1 to 2 most preferably 1 and preferably an average alkyl chain length of between 8 and 18. Preferably the alkoxylated alkyl sulphate has an average alkyl chain length between 10 and 16, more preferably between 12 and 14. Preferably, the linear alkylbenzene sulphonate is a $C_{10}$-$C_{16}$ linear alkylbenzene sulphonate or a $C_{11}$-$C_{14}$ linear alkylbenzene sulphonate or a mixture thereof.

The solid laundry detergent composition may comprise a non-ionic surfactant (also classed as a non-soap surfactant). When present, preferably the non-ionic surfactant is selected from an alkoxylated alcohol preferably selected from a natural or olefin derived fatty alcohol alkoxylate, an oxo-synthesised fatty alcohol alkoxylate, Guerbet fatty alcohol alkoxylates, alkyl phenol alcohol alkoxylates or a mixture thereof. The alcohol alkoxylate may have an average degree of alkoxylation of between 0.5 and 10, preferably between 1 and 9, more preferably between 3 and 8, more preferably a degree of ethoxylation of between 0.5 and 10, preferably between 1 and 9, more preferably between 3 and 8, most preferably between 5 and 8 or even from about 7 to about 8. The alcohol alkoxylate may have an average alkyl chain length of between 8 and 18, preferably between 10 and 16, more preferably between 12 and 15.

Preferably, the solid laundry detergent composition comprises between 20% and 75%, more preferably between 30% and 70%, most preferably between 40% and 60% by weight of the solid laundry detergent composition of non-soap surfactant. If a liquid composition is also present within a further compartment of the unit dose article, preferably the liquid composition comprises less than 20%, preferably less than 10%, more preferably less than 5% by weight of the liquid composition of a surfactant. Preferably all surfactant will be present within the solid particulate laundry detergent composition.

The solid composition at 1 wt % dilution in deionized water at 20° C. has an equilibrium pH in the range of from 6.5 to 8.8, preferably between 6.7 and 8.5, more preferably between 7 and 8. Without wishing to be bound by theory, the specific low pH of the solid laundry detergent composition provides for improved fabric cleaning or treatment performance of the water-soluble unit dose article according to the present invention as compared to water-soluble unit dose articles wherein the solid laundry detergent composition has a higher pH. Such higher pH solid laundry detergent composition formulated into water-soluble unit dose articles are known in the art.

Those skilled in the art will know how to measure the pH using common known techniques. A preferred method is to obtain a 10 g sample accurately weighed to two decimal places, of the solid laundry detergent composition. The sample should preferably be obtained using a Pascall sampler in a dust cabinet. Add the 10 g sample to a plastic beaker and add 200 ml of carbon dioxide-free de-ionised water. Agitate using a magnetic stirrer on a stirring plate at 150 rpm until fully dissolved and for at least 15 minutes. Transfer the contents of the beaker to a 1 litre volumetric flask and make up to 1 litre with Cardon dioxide-free de-ionised water. Mix well and take a 100 mls±1 ml aliquot using a 100 mls pipette immediately. Measure and record the pH and temperature of the sample using a pH meter capable of reading to ±0.01 pH units, with stirring, ensuring temperature is 20° C.+/−0.5° C.

Preferably, the solid laundry detergent composition comprises a material selected from zeolite, sodium carbonate, sodium bicarbonate, sodium sulphate, silica, organic acid or a mixture thereof. The solid laundry detergent composition may comprise between 15% and 40%, more preferably between 18% and 30% by weight of the solid laundry detergent composition of the material. The solid laundry detergent composition may comprise a material selected from sodium carbonate, potassium carbonate, sodium bicarbonate, sodium bicarbonate, burkeite, sequicarbonate, habit modified carbonate, crystal growth modified burkeite or a mixture thereof, preferably sodium carbonate. The solid laundry detergent composition may comprise between 15% and 40%, more preferably between 18% and 30% by weight of the solid laundry detergent composition of the material.

The solid laundry detergent composition may comprise an organic acid, preferably between 1% and 10% by weight of the solid laundry detergent composition of an organic acid and/or a salt thereof. Preferably, the organic acid is a carboxylic acid, preferably a polycarboxylic acid, more preferably the organic acid is selected from citric acid, malic acid, lactic acid, propionic acid, valeric acid, caproic acid, carbonic acid, adipic acid, gluconic acid, methylglycinediacetic acid or a mixture thereof, most preferably citric acid. Without wishing to be bound by theory such materials may be used to control the pH of the laundry detergent composition.

The solid laundry detergent composition may comprise an adjunct ingredient, wherein the adjunct ingredient is preferably selected from cationic polymers, brightener, dye transfer inhibitors, chelants including aminocarboxylate and aminophosphonate chelants such as HEDP, enzymes, acrylate-based polymers, perfumes and perfume capsules, polyester terephthalate polymers, PEG-based polymers, ethoxylated polyethyleneimines, polysaccharides such as carboxymethylcellulose, amine oxide, aesthetic dyes, hueing dyes, antifoams, bleaching actives, or a mixture thereof.

Preferably the solid laundry detergent composition comprises a bleaching active.

Preferred acrylate-based polymers are acrylate/maleate random copolymers.

Preferred cationic polymer are cationically-modified polysaccharides. Preferably, the cationically modified polysaccharide is selected from cationic guar gums, cationic cellulosic polymers, and mixtures thereof, most preferably cationic cellulosic polymers even more preferably cationically modified hydroxyethyl cellulose, most preferably, hydroxyethyl cellulose derivatised with trimethyl ammonium substituted epoxide.

Preferably, the particulate laundry detergent composition comprises agglomerates. Preferably, the agglomerates comprise non-soap surfactant, sodium sulphate and silica. Preferably said agglomerates further comprise a polymer preferably selected from acrylate homopolymers, acrylate/maleate copolymers or mixtures thereof. Without wishing to be bound by theory it is believed the addition of the polymer will provide for a harder agglomerate which is less susceptible for breakage prior to use.

A further aspect of the present invention is the use of a solid laundry detergent composition comprising a non-soap anionic surfactant and having at 1 wt % dilution in deionized water at 20° C. an equilibrium pH in the range of from 6.5 to 8.8 as according to the present invention in a water-soluble unit dose article to improve fabric treatment performance of said water-soluble unit dose article.

Method of Washing

An aspect of the present invention is a method of washing comprising the steps of adding the water-soluble unit dose article according to the present invention to sufficient water to dilute the solid particulate laundry detergent composition by a factor of at least 300 fold to create a wash liquor and contacting fabrics to be washed with said wash liquor.

The method may be performed in a hand wash operation, an automatic laundry washing machine or a mixture thereof.

Process of Making

Those skilled in the art will know how to make the unit dose article and particulate laundry detergent composition of the present invention using known techniques in the art:

Water Soluble Pouch Making:

During manufacture, a first water-soluble film may be shaped to comprise an open compartment into which the detergent composition is added. A second water-soluble film is then laid over the first film in such an orientation as to close the opening of the compartment. The first and second films are then sealed together along a seal region using known sealing means such as solvent, heat or a mixture thereof.

Preparation of Free-Flowing Detergent Powders:

Highly preferred are free-flowing detergent powders. Without wishing to be bound by theory, free-flowing detergent powders are found to have improved dissolution when formulated in a water soluble pouch compared to compressed powders, leaving less detergent residues behind accordingly. Highly free-flowing detergent powders can be prepared by the following process.

Surfactant-containing particles can be prepared by spray-drying, agglomeration or other processes such as drum drying etc. Such agglomerates are preferred due to the high surfactant loading that can be achieved. However other processes can be used. The surfactant agglomerates preferably contain anionic surfactant, including LAS. An especially preferred feature is that the surfactant agglomerates contain a mixture of anionic surfactants, especially LAS and AES surfactant.

To improve the flowability and stability of the detergent powder(s), smaller particles are usually removed by sieving. It is especially preferred to sieve the surfactant agglomerates plus other detergent ingredients prior to any subsequent coating step. The surfactant agglomerates, plus other granular detergent ingredients such as HEDP, are sieved to remove particles smaller than 600 microns. The surfactant particles, plus any other detergent ingredients that are optionally added, are then put into a mixer where they are dusted or coated with a fine powder to provide a protective layer on the surface. An example of such a process is where blown powders are coated with non-ionic surfactant as a binder and then zeolite. It has been found, though, that dusting or coating the surfactant agglomerates (and other optional detergent ingredients) in this instance with a blend of micronized sodium sulphate and zeolite gives good results for flowability as well as appearance etc. Inclusion of a liquid binder to help the adhesion of the fine powder(s) to the surface of the larger surfactant agglomerates is also an option.

A suitable detergent mix can be prepared as follows. Surfactant agglomerates containing a blend of LAS and AExS anionic surfactants are prepared and dried to give particles with a total surfactant activity of 60% comprising a 2:1 blend of LAS to AExS surfactants. The particles contain 20% of hydrophilic silica. A suitable silica is 22S from Evonik. The balance consists of ground sodium sulphate, water and miscellaneous. The fine particles are then removed by sieving the agglomerates on a 600 micron mesh sieve. Oversize particles are removed by sieving the agglomerates through a 1400 micron mesh size sieve.

3 kg of the sieved surfactant agglomerates are then put into a 6-litre internal volume paddle mixer from Forberg. 300 g of ground sodium sulphate (d90<100 microns) and 100 g of sodium aluminosilicate type 4A are then added to the mixer and the mixer is run at maximum speed for 2 minutes, thus coating the surface of the agglomerates with sulphate and zeolite. The coated agglomerates are then removed and blended with other detergent materials to give a free-flowing detergent mixture suitable for use.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

EXAMPLES

The below tests show a consistently improved performance profile for low versus high pH powder compositions within a water soluble pouch.

Test 1: Whiteness—Improving Brightener Efficacy:

Test Method:

In order to demonstrate the impact in providing improved whiteness of formulating with a brightener in a low pH powder vs in a high pH powder contained within a PVA film pouch, a whiteness maintenance full scale test has been conducted. A short cotton cycle at 40° C. and 6 gpg water hardness was selected on a Miele washing machine (model 986). Total run time was 1 hour 25 minutes. 2.5 kg cotton ballast loads (sourced from Warwick Equest Ltd. Unit 55, Consett Business Park, Consett, County Durham, DH8 6BN) were added together with a soiled load (8 SBL2004 soiled ballast sheets ex wfk Testgewebe GmbH Christenfeld 10, D-41379 Bruggen-Bracht Germany order ref 10996). White fabric bundles (8 in total containing Terry Towel, Knitted Cotton, Flat Cotton, Polycotton and Polyester sourced from Warwick Equest Ltd. Unit 55, Consett Business Park, Consett, County Durham, DH8 6BN) were added to each machine and washed in either reference product or test product. Four wash cycles were carried out, removing soiled ballast sheets each time and adding four more along with the addition of product. After repeating the wash process four times, whiteness bundles were removed and tumble dried in an electric Miele tumble dryer (Novotronic T430) set to "extra dry".

Fabric tracers were then analysed using a bench-top spectrophotometer Konica-Minolta model CM-3630 which when combined with Polaris White Star software (ex Axiphos GmbH Arend-Braye Str. 42, D-79540 Loerrach, Germany) allows the extraction of reflectance data in the range of 360-740 nm. In order to determine the impact of brightener in a low pH powder vs High pH powder on deposition of optical brightener, L a b measurements were taken (The lightness, $L^*$, represents the darkest black at $L^*=0$, and the brightest white at $L^*=100$. The colour channels, $a^*$ and $b^*$, will represent true neutral grey values at $a^*=0$ and $b^*=0$. The red/green opponent colours are represented along the $a^*$ axis, with green at negative $a^*$ values and red at positive $a^*$ values. The yellow/blue opponent colors are represented along the $b^*$ axis, with blue at negative $b^*$ values and yellow at positive $b^*$ values) a more negative b value showing higher light emission in the blue region (420-470 nm) which is a function of optical brightening agents as they absorb light in the ultraviolet/violet region (340-370 nm) and re-emit in the blue.

Test Products:

LAS/AE1S Agglomerate

| Constituent | % w/w Base Powder |
|---|---|
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

Liquid Additive Mix

| Constituent | % w/w |
|---|---|
| Ethoxylated Polyethyleneimine (PEI600EO20 - 80%) | 28 |
| PEG-Vinyl Acetate co-polymer (72.5%) | 38.4 |
| Nonionic surfactant (C24AE7) | 33.6 |
| Total | 100 |

Test Base—Low pH

| Constituent | % w/w Base Powder |
|---|---|
| LAS/AE1S Agglomerate | 67.04 |
| Carboxymethyl cellulose (98%) (Finnfix GDA ex CP Kelco) | 1.77 |
| Texcare SRA300 Soil release polymer | 0.54 |
| Na HEDP Etidronic Acid (86.8%) | 14.25 |
| Zeolite | 2.20 |
| Acusol 4445N Polymer (92.6%) | 4.08 |
| Dow Corning GP-4314 Powdered Antifoam (12% active) | 2.34 |
| Lipase (18.5 mg/g) | 1.99 |
| Stainzyme Plus (14.4 mg/g) | 1.15 |
| Protease | 1.74 |
| Cellulase (15.6 mg/g) | 1.41 |
| Mannanase (4 mg/g) | 1.52 |
| Total | 100.0 |

Reference Base—High pH

| Constituent | % w/w Base Powder |
|---|---|
| LAS/AE1S Agglomerate | 51.84 |
| Carboxymethyl cellulose (98%) (Finnfix GDA ex CP Kelco) | 1.37 |
| Texcare SRA300 Soil release polymer | 0.42 |
| Na HEDP Etidronic Acid (86.8%) | 11.0 |
| Zeolite | 1.70 |
| Acusol 4445N Polymer (92.6%) | 3.15 |
| Dow Corning GP-4314 Powdered Antifoam (12% active) | 1.81 |
| Lipase (18.5 mg/g) | 1.54 |
| Stainzyme Plus (14.4 mg/g) | 0.89 |
| Protease | 1.34 |
| Cellulase (15.6 mg/g) | 1.08 |
| Mannanase (4 mg/g) | 1.17 |
| Sodium Carbonate | 22.93 |
| Total | 100 |

Products Tested

High pH Reference: 13.74 g of High pH reference base powder formulation & 0.11 g of Brightener 49 Tinopal CBS contained in a PVA film* pouch & 1.25 ml of liquid additive mix formulation.

Low pH Test formulation (according to the invention): 10.62 g Low pH test base formulation & 0.11 g of Brightener 49 Tinopal CBS contained in a PVA film* & 1.25 ml liquid additive mix formulation.

* PVA Film: M9400 provided by Monosol LLC, 707 East 80th Place, Suite 301, Merrillville, Ind. 4641

Results

As can be seen from the b-values tabulated below, brightener inclusion in the low pH test formulation according to the invention provides a more negative average b value across 4 fabrics tested vs brightener inclusion in high pH reference formulation outside the scope of the invention. This more negative b value results in brighter fabrics.

| b * Value Low pH vs High pH with Brightener | | |
|---|---|---|
| Fabric Type | High pH Ref | Low pH Test |
| Terry Towel | −15.16 | −15.49 |
| Polycotton | −14.69 | −15.82 |
| Polyester | −14.6 | −14.17 |
| Knitted Cotton | −13.24 | −13.73 |
| Average | −14.42 | −14.80 |

Test 2: Softness & Improving CatHEC Efficacy:
Test Method:

In order to show the impact in providing improved fabric feel benefits of formulating with a low pH powder vs high pH powder contained within a pouch in presence & absence of modified hydroxyethyl cellulose, a softness full scale test has been conducted. Black cotton bath towels (sourced from The Range retail shop, North Tyne Industrial Estate, Whitley Rd, Benton NE12 9EZ, United Kingdom) were desized using a Miele machine (model 1714), cotton short cycle, 60° C., city water (7.8 gpg), total wash time 1 hour 25 mins×3 wash cycles, the first cycle containing 38 g of ECE standard detergent (sourced from wfk Testgewebe GmbH, Christenfeld 10, D-41379 Bruggen, Germany) the remaining two cycles were run with no product. Fabrics were dried using a gas dryer set at medium heat for 30 minutes and consequently cut into 15 cm×15 cm swatches×8 ready to be used in full scale test the following day. For the softness test a short cotton cycle at 40° C. and 6 gpg hardness has been selected on a Miele washing machine (model 3622). Total run time was 1 hour and 25 minutes, 2.5 kg cotton ballast loads (sourced from Calderon Textiles) were added to each machine and washed in either reference A/B or test product A/B. Four wash cycles were carried out. Black towel tracers were removed and left overnight to dry in drying room (20° C./55% RH) and were then paneled by 3 panelists the following day to assess the softness grading, using pairwise comparison Ref A vs Test A, Ref B vs Test B, following standard grading scale:

Grading Scale

4—This product on the left is a whole lot better.
3—This product on the left is a lot better.
2—I know this product on the left is a little better.
1—I think this product on the left is better.
0—There is no difference between the two products.

Test Products:
LAS/AE1S Agglomerate

| Constituent | % w/w Base Powder |
| --- | --- |
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

Liquid Additive Mix

| Constituent | % w/w |
| --- | --- |
| Ethoxylated Polyetheyleneimine (PEI600EO20 - 80%) | 28 |
| PEG-Vinyl Acetate co-polymer (72.5%) | 38.4 |
| Nonionic surfactant (C24AE7) | 33.6 |
| Total | 100 |

Test Base—Low pH

| Constituent | % w/w Base Powder |
| --- | --- |
| LAS/AE1S Agglomerate | 66.27 |
| Carboxymethyl cellulose (98%) (Finnfix GDA ex CP Kelco) | 1.75 |
| Brightener 49 Tinopal ® CBS-X | 1.15 |
| Texcare SRA300 Soil release polymer | 0.53 |
| Na HEDP Etidronic Acid (86.8%) | 14.09 |
| Zeolite | 2.17 |
| Acusol 4445N Polymer (92.6%) | 4.03 |
| Dow Corning GP-4314 Powdered Antifoam (12% active) | 2.31 |
| Lipase (18.5 mg/g) | 1.97 |
| Stainzyme Plus (14.4 mg/g) | 1.14 |
| Protease | 1.72 |
| Cellulase (15.6 mg/g) | 1.39 |
| Mannanase (4 mg/g) | 1.50 |

Reference Base—High pH

| Constituent | % w/w Base Powder |
| --- | --- |
| LAS/AE1S Agglomerate | 51.25 |
| Carboxymethyl cellulose (98%) (Finnfix GDA ex CP Kelco) | 1.35 |
| Brightener 49 Tinopal ® CBS-X | 0.89 |
| Texcare SRA300 Soil release polymer | 0.41 |
| Na HEDP Etidronic Acid (86.8%) | 10.89 |
| Zeolite | 1.68 |
| Acusol 4445N Polymer (92.6%) | 3.11 |
| Dow Corning GP-4314 Powdered Antifoam (12% active) | 1.79 |
| Lipase (18.5 mg/g) | 1.53 |
| Stainzyme Plus (14.4 mg/g) | 0.88 |
| Protease | 1.33 |
| Cellulase (15.6 mg/g) | 1.07 |
| Mannanase (4 mg/g) | 1.16 |
| Sodium Carbonate | 22.67 |

Products Tested:

High pH Ref A (nil CatHEC): 13.9 g of High pH reference base formulation contained in a PVA film* pouch & 1.25 ml of Liquid additive mix formulation.

High pH Ref B (with CatHEC): 13.9 g of High pH reference base formulation & 0.2 g of modified hydroxyethyl cellulose (Polymer PK ex Dow Company) contained in a PVA film* pouch & 1.25 ml of liquid additive mix formulation.

Low pH Test leg A (nil CatHEC): 10.75 g of Low pH reference formulation contained in a PVA film* pouch & 1.25 ml Liquid additive mix formulation.

Low pH Test leg B (with CatHEC): 10.75 g of Low pH reference formulation & 0.2 g of modified hydroxyethyl cellulose (Polymer PK ex Dow Company) contained in a PVA film* & 1.25 ml of liquid additive mix formulation.

* PVA Film: M9400 provided by Monosol LLC, 707 East 80th Place, Suite 301, Merrillville, Ind. 4641

Results

The results tabulated below show an improved fabric feel benefit for a low versus high pH powder formulation, a benefit that is further enhanced in presence versus in absence of CatHEC technology.

| | Low pH (Preference) | High pH (Preference) | Low pH vs High pH grading |
| --- | --- | --- | --- |
| Nil CatHEC | 62% | 38% | +0.67 |
| With CatHEC | 88% | 12% | +1.47 |

Test 3: Cleaning Efficacy:

Test Method:

In order to demonstrate the impact in providing improved cleaning performance of formulating a low pH powder vs a high pH powder contained within a PVA film pouch, a stain removal full scale test has been conducted. A short cotton cycle at 40° C. and 6 gpg water hardness was selected on a Miele washing machine (model 3622), total run time was 1 hour 25 minutes. 2.5 kg cotton ballast loads (sourced from Warwick Equest Ltd. Unit 55, Consett Business Park, Consett, County Durham, DH8 6BN) were added together with a soiled load (4 SBL2004 soiled ballast sheets ex wfk Testgewebe GmbH Christenfeld 10. D-41379 Bruggen-Bracht Germany). Stain sets (sourced from Warwick Equest Ltd. Unit 55, Consett Business Park, Consett, County Durham, DH8 6BN) were added to each machine and washed in either high pH reference product or low pH test product. Four wash cycles were carried out, removing soiled ballast sheets each time and adding four more along with the addition of product. After repeating the wash process four times, stain sets were removed and tumble dried in an electric Miele tumble dryer (Novotronic T430) set to "extra dry". Stains were then analysed using a Stain Removal Index (SRI), the higher the SRI value the better the stain removal performance is. ASRI denoted the difference in SRI between the Reference and Test products.

Test Products:

LAS/AE1S Agglomerate

| Constituent | % w/w Base Powder |
| --- | --- |
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

Liquid Additive Mix

| Constituent | % w/w |
| --- | --- |
| Ethoxylated Polyethyleneimine (PEI600EO20 - 80%) | 28 |
| PEG-Vinyl Acetate co-polymer (72.5%) | 38.4 |
| Nonionic surfactant (C24AE7) | 33.6 |
| Total | 100 |

A. Grass Cleaning Performance:

Test Base—Low pH

| Constituent | % w/w Base Powder |
| --- | --- |
| LAS/AE1S Agglomerate | 69.65 |
| Carboxymethyl cellulose (98%) (Finnfix GDA ex CP Kelco) | 1.84 |
| Brightener 49 Tinopal ® CBS-X | 1.21 |
| Texcare SRA300 Soil release polymer | 1.14 |
| Na HEDP Etidronic Acid (86.8%) | 14.81 |
| Zeolite | 2.28 |
| Dow Corning GP-4314 Powdered Antifoam (12% active) | 2.43 |
| Lipase (18.5 mg/g) | 2.07 |
| Stainzyme Plus (14.4 mg/g) | 1.20 |
| Protease | 1.80 |
| Mannanase (4 mg/g) | 1.57 |
| Total | 100 |

Reference Base—High pH

| Constituent | % w/w Base Powder |
| --- | --- |
| LAS/AE1S Agglomerate | 53.57 |
| Carboxymethyl cellulose (98%) (Finnfix GDA ex CP Kelco) | 1.42 |
| Brightener 49 Tinopal ® CBS-X | 0.93 |
| Texcare SRA300 Soil release polymer | 0.88 |
| Na HEDP Etidronic Acid (86.8%) | 11.39 |
| Zeolite | 1.75 |
| Dow Corning GP-4314 Powdered Antifoam (12% active) | 1.87 |
| Lipase (18.5 mg/g) | 1.59 |
| Stainzyme Plus (14.4 mg/g) | 0.92 |
| Protease | 1.38 |
| Mannanase (4 mg/g) | 1.21 |
| Sodium Carbonate | 23.08 |
| Total | 100 |

Products Tested

Low pH Test A: 10.69 g of Low pH test base formulation contained in a PVA film* pouch & liquid addition of 0.42 g of non-ionic surfactant (C24AE7).

Low pH Test B: 10.69 g Low pH test base formulation and 0.45 g Acusol 445N contained in a PVA film* pouch & liquid addition of 0.42 g of non-ionic surfactant (C24AE7).

High pH Ref A: 13.90 g of High pH reference base formulation contained in a PVA film* pouch & liquid addition of 0.42 g of non-ionic surfactant (C24AE7).

High pH Ref B: 13.90 g High pH reference base formulation and 0.45 g Acusol 445N contained in a PVA film* pouch & liquid addition of 0.42 g of non-ionic surfactant (C24AE7).

* PVA Film: M9400 provided by Monosol LLC, 707 East 80th Place, Suite 301, Merrillville, Ind. 4641

Results

The results tabulated below show that there is improved stain removal of grass stains in a low versus a high pH formulation, the performance delta getting magnified in presence versus in absence of Acusol 445N technology.

| Soil | Low pH Test without Acusol 445N | High pH Test without Acusol 445N | Low pH Test with Acusol 445N | High pH Test with Acusol 445N |
| --- | --- | --- | --- | --- |
| Grass | 45.7 | 44.4 | 53.6 | 40.5 |

B. Bleachable Stain Cleaning Performance:

Test Base—Low pH

| Constituent | % w/w Base Powder |
| --- | --- |
| LAS/AE1S Agglomerate | 76.82 |
| Carboxymethyl cellulose (98%) (Finnfix GDA ex CP Kelco) | 2.04 |
| Brightener 49 Tinopal ® CBS-X | 1.34 |
| Texcare SRA300 Soil release polymer | 0.62 |

-continued

| Constituent | % w/w Base Powder |
|---|---|
| Acusol 4445N Polymer (92.6%) | 4.69 |
| Zeolite | 2.53 |
| Dow Corning GP-4314 Powdered Antifoam (12% active) | 2.69 |
| Lipase (18.5 mg/g) | 2.29 |
| Stainzyme Plus (14.4 mg/g) | 1.33 |
| Protease | 2.00 |
| Cellulase (15.5 mg/g) | 1.62 |
| Mannanase (4 mg/g) | 1.75 |
| Total | 100 |

Reference Base—High pH

| Constituent | % w/w Base Powder |
|---|---|
| LAS/AE1S Agglomerate | 57.50 |
| Carboxymethyl cellulose (98%) (Finnfix GDA ex CP Kelco) | 1.52 |
| Brightener 49 Tinopal ® CBS-X | 1.00 |
| Texcare SRA300 Soil release polymer | 0.46 |
| Acusol 4445N polymer (92.6%) | 3.49 |
| Zeolite | 1.88 |
| Dow Corning GP-4314 Powdered Antifoam (12% active) | 2.01 |
| Lipase (18.5 mg/g) | 1.72 |
| Stainzyme Plus (14.4 mg/g) | 0.99 |
| Protease | 1.49 |
| Cellulase (15.6 mg/g) | 1.20 |
| Mannanase (4 mg/g) | 1.30 |
| Sodium Carbonate | 25.44 |
| Total | 100 |

Products Tested

High pH Ref A: 11.65 g of High pH Ref base formulation contained in a PVA film* pouch & 1.25 ml of liquid additive mix.

Low pH Test leg A: 8.52 g of Low pH Test base formulation contained in a PVA film* pouch & 1.25 ml of liquid additive mix.

High pH Ref B: 11.65 g of High pH Ref base formulation and 1.35 g of NaHEDP Etidronic Acid (86.8%) contained in a PVA film* pouch & 1.25 ml of liquid additive mix.

High pH Test leg B: 8.52 g of Low pH Test base formulation and 1.35 g of NaHEDP Etidronic Acid (86.8%) contained in a PVA film* pouch & 1.25 ml of liquid additive mix.

* PVA Film: M9400 provided by Monosol LLC, 707 East 80th Place, Suite 301, Merrillville, Ind. 4641

Results

The results tabulated below show that there is improved stain removal of tea and red wine bleachable stains in a low versus a high pH formulation, the performance delta getting magnified in presence versus in absence of NaHEDP technology.

| Soil | High pH Ref without NaHEDP | Low pH Test without NaHEDP | High pH Ref with NaHEDP | Low pH Test with NaHEDP |
|---|---|---|---|---|
| Tea | 10.8 | 28.7 | 11.0 | 38.4 |
| Red Wine | 42.0 | 61.9 | 46.4 | 72.0 |
| Average | 26.4 | 45.3 | 28.7 | 55.2 |

C. Grease Sensitive Stain Cleaning Performance:
Test Base—Low pH

| Constituent | % w/w Base Powder |
|---|---|
| LAS/AE1S Agglomerate | 71.81 |
| Carboxymethyl cellulose (98%) (Finnfix GDA ex CP Kelco) | 1.90 |
| Brightener 49 Tinopal ® CBS-X | 1.25 |
| Texcare SRA300 Soil release polymer | 0.57 |
| Na HEDP Editronic Acid (86.8%) | 15.27 |
| Acusol 4445N Polymer (92.6%) | 4.36 |
| Zeolite | 2.35 |
| Dow Corning GP-4314 Powdered Antifoam (12% active) | 2.50 |
| Total | 100 |

Reference Base—High pH

| Constituent | % w/w Base Powder |
|---|---|
| LAS/AE1S Agglomerate | 55.53 |
| Carboxymethyl cellulose (98%) (Finnfix GDA ex CP Kelco) | 1.46 |
| Brightener 49 Tinopal ® CBS-X | 0.96 |
| Texcare SRA300 Soil release polymer | 0.44 |
| NaHEDP Etidronic acid (86.6%) | 11.80 |
| Zeolite | 1.82 |
| Acusol 4445N polymer (92.6% | 3.37 |
| Dow Corning GP-4314 Powdered Antifoam (12% active) | 1.94 |
| Lipase (18.5 mg/g) | 1.72 |
| Stainzyme Plus (14.4 mg/g) | 0.99 |
| Protease | 1.49 |
| Cellulase (15.6 mg/g) | 1.20 |
| Mannanase (4 mg/g) | 1.30 |
| Sodium Carbonate | 24.56 |
| Total | 100 |

Enzyme Cocktail:

| Constituent | % w/w Base Powder |
|---|---|
| Lipase (18.5 mg/g) | 25.54 |
| Stainzyme Plus (14.4 mg/g) | 14.82 |
| Protease | 22.29 |
| Cellulase (15.6 mg/g) | 17.95 |
| Mannanase (4 mg/g) | 19.40 |
| Total | 100 |

Products Tested

High pH Ref A: 13.07 g of High pH Ref base formulation contained in a PVA film* pouch & 1.25 ml of liquid additive mix.

Low pH Test leg A: 9.92 g of Low pH Test base formulation contained in a PVA film* pouch & 1.25 ml of liquid additive mix.

High pH Ref B: 13.07 g of High pH Ref base formulation and 0.83 g of enzyme cocktail contained in a PVA film* pouch & 1.25 ml of liquid additive mix.

High pH Test leg B: 9.92 g of Low pH Test base formulation and 0.83 g of enzyme cocktail contained in a PVA film* pouch & 1.25 ml of liquid additive mix.

* PVA Film: M9400 provided by Monosol LLC, 707 East 80th Place, Suite 301, Merrillville, Ind. 4641

Results

The results tabulated below show that there is improved stain removal of greasy stains in a low versus a high pH formulation, the performance delta getting magnified in presence versus in absence of enzyme technology especially lipase technology.

| Soil | High pH Ref without enzyme | Low pH Test without enzyme | High pH Ref with enzyme | Low pH Test with enzyme |
|---|---|---|---|---|
| Burnt butter | 38.3 | 46.7 | 50.0 | 59.9 |
| Cooked beef | 18.9 | 25.6 | 31.8 | 41.8 |
| Dyed Bacon | 45.5 | 48.8 | 50.5 | 53.2 |
| Make-up | 21.8 | 28.9 | 24.1 | 33.9 |
| Average | 31.1 | 37.5 | 39.1 | 47.2 |

Test 4: Perfume Headspace Performance:

Test Method:

In order to show the impact in providing improved perfume headspace benefits of formulating with a low pH powder vs high pH powder contained within a pouch, a full scale wash test has been conducted in combination with a Gas Chromatography (GC) headspace analysis. 4 Tonrose bath towels (ca 2 kg, sourced from Tonrose Ltd, Tonrose House, Petre Road, Accrington, Lancashire, BB5 5JB-United Kingdom) were washed in a Miele washing machine (model 3922-cotton short cycle, 60° C., city water—7.8 gpg—, total wash time 1 hour 25 mins). 0.5 g of GP-4314 Powdered Antifoam suds suppressor technology (sourced from the Dow Corning company) has been added to prevent over-sudsing. The wash cycle was stopped after 39 minutes, i.e. 2 minutes prior to onset of rinse cycle, and a sample of the wash water was taken using a 10 ml syringe. 5 mls of this wash solution is added to a 20 ml headspace vial (Sigma # Vials=SU860097, Caps=SU860101) and submitted for GC analysis of Ester content in headspace. A total of 6 replicates (3 different washes and 2 samples per wash) were tested for both the low pH test product and the high pH reference products. Relative averaged testing results are summarized below.

Test Products:

LAS/AE1S Agglomerate

| Constituent | % w/w Base Powder |
|---|---|
| LAS Linear alkyl benzene sulfonate | 50 |
| C12-14 Alky Ethoxylate (1) Sulphate | 20 |
| Sodium Sulphate | 7.5 |
| Silica | 18.75 |
| Free water | 3.75 |
| Total | 100 |

Liquid Additive Mix

| Constituent | % w/w |
|---|---|
| Ethoxylated Polyethyleneimine (PEI600EO20-80%) | 20 |
| PEG-Vinyl Acetate co-polymer (72.5%) | 27 |
| Nonionic surfactant (C24AE7) | 24 |
| Perfume Accord | 29 |
| Total | 100 |

Perfume Accord

| | Composition |
|---|---|
| Benzyl Acetate | 1.5 mL |
| Allyl Cyclohexane Propionate | 1.5 mL |
| Hexyl Acetate | 1.5 mL |
| Frutene | 1.5 mL |
| Verdox (OTBCA) | 1.5 mL |
| Allyl Amyl Glycolate | 1.5 mL |
| Flor Acetate | 1.5 mL |
| TRICYCLODECENYL ACETATE | |
| Hedione (Methyl Dihydro Jasmonate) | 1.5 mL |
| Hexyl Salicylate | 1.5 mL |
| Cyclohexyl Salicylate | 1.5 mL |
| Eucalyptol | 1.5 mL |
| Geraniol | 1.5 mL |
| Citronellol | 1.5 mL |

Test Base—Low pH

| Constituent | % w/w Base Powder |
|---|---|
| LAS/AE1S Agglomerate | 66.27 |
| Carboxymethyl cellulose (98%) (Finnfix GDA ex CP Kelco) | 1.75 |
| Brightener 49 Tinopal ® CBS-X | 1.15 |
| Texcare SRA300 Soil release polymer | 0.53 |
| Na HEDP Etidronic Acid (86.8%) | 14.09 |
| Zeolite | 2.17 |
| Acusol 4445N Polymer (92.6%) | 4.03 |
| Dow Corning GP-4314 Powdered Antifoam (12% active) | 2.31 |
| Lipase (18.5 mg/g) | 1.97 |
| Stainzyme Plus (14.4 mg/g) | 1.14 |
| Protease | 1.72 |
| Cellulase (15.6 mg/g) | 1.39 |
| Mannanase (4 mg/g) | 1.50 |

Reference Base—High pH

| Constituent | % w/w Base Powder |
|---|---|
| LAS/AE1S Agglomerate | 51.25 |
| Carboxymethyl cellulose (98%) (Finnfix GDA ex CP Kelco) | 1.35 |
| Brightener 49 Tinopal ® CBS-X | 0.89 |
| Texcare SRA300 Soil release polymer | 0.41 |
| Na HEDP Etidronic Acid (86.8%) | 10.89 |
| Zeolite | 1.68 |
| Acusol 4445N Polymer (92.6%) | 3.11 |
| Dow Corning GP-4314 Powdered Antifoam (12% active) | 1.79 |
| Lipase (18.5 mg/g) | 1.53 |
| Stainzyme Plus (14.4 mg/g) | 0.88 |
| Protease | 1.33 |
| Cellulase (15.6 mg/g) | 1.07 |
| Mannanase (4 mg/g) | 1.16 |
| Sodium Carbonate | 22.67 |

Products Tested:
High pH Ref: 13.9 g of High pH reference base formulation contained in a PVA film* pouch & 1.75 ml of Liquid additive mix formulation.
Low pH Test leg: 10.75 g of Low pH reference formulation contained in a PVA film* pouch & 1.75 ml Liquid additive mix formulation.
* PVA Film: M9400 provided by Monosol LLC, 707 East 80th Place, Suite 301, Merrillville, Ind. 4641

Results

The results tabulated below show an improved perfume headspace performance for benzyl acetate and methyl dihydro jasmonite perfume materials for a low versus high pH powder formulation (expressed as relative amount of PRM in headspace). Beyond for allyl amyl glycolate, no material was detected in the headspace for the high pH formulation, contrary to the low pH formulation.

|  | % Change in PRM level in headspace |
|---|---|
| Benzyl acetate | 213% |
| Methyl dihydro jasmonite | 121% |

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern."

"While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising a water-soluble film and a solid laundry detergent composition, wherein the water-soluble film defines a first internal compartment; and
   wherein the solid laundry detergent composition is comprised within the first internal compartment; and
   wherein the solid composition comprises a non-soap anionic surfactant; and
   wherein the solid laundry detergent composition comprises particles and wherein the particles are spray-dried particles, agglomerates, extrudates, or a mixture thereof; and
   wherein the solid composition at about 1 wt % dilution in deionized water at about 20° C. has an equilibrium pH in the range of from about 6.5 to about 8.8.

2. The water-soluble unit dose article according to claim 1 wherein the non-soap anionic surfactant comprises linear alkylbenzene sulphonate, alkoxylated alkyl sulphate or a mixture thereof.

3. The water-soluble unit dose article according to claim 2 wherein the weight ratio of linear alkylbenzene sulphonate to alkoxylated alkyl sulphate is from about 1:2 to about 20:1.

4. The water-soluble unit dose article according to claim 1, wherein the solid laundry detergent composition comprises between about 20% and about 75% by weight of the solid laundry detergent composition of the non-soap anionic surfactant.

5. The water-soluble unit dose article according to claim 1 wherein the solid laundry detergent composition comprises an adjunct ingredient, wherein the adjunct ingredient is selected from non-ionic surfactants, cationic polymers, brightener, dye transfer inhibitors, chelants, enzymes, acrylate-based polymers, perfumes and perfume capsules, polyester terephthalate polymers, PEG-based polymers, ethoxylated polyethyleneimines, polysaccharides, amine oxide, aesthetic dyes, hueing dyes, antifoams, or a mixture thereof.

6. The water-soluble unit dose article according to claim 1 wherein the equilibrium pH is between about 6.7 and about 8.5.

7. The water-soluble unit dose article according to claim 1 wherein the agglomerates comprise non-soap surfactant, sodium sulphate and silica.

8. The water-soluble unit dose article according to claim 1 wherein the solid laundry detergent composition is a free flowing particulate solid, a compressed particulate solid or a mixture thereof and has a mean particle size between about 400 microns and about 1000 microns.

9. The water-soluble unit dose article according to claim 1 wherein the solid laundry detergent composition has a bulk density of between about 400 and about 1000 g/l.

10. The water-soluble unit dose article according to claim 9 wherein the solid laundry detergent composition has a bulk density of between about 500 and about 800 g/l.

11. The water-soluble unit dose article according to claim 1 wherein the first compartment comprises between about 1 g and about 25 g of the solid laundry composition.

12. The water-soluble unit dose article according to claim 11 wherein the first compartment comprises between about 5 g and about 20 g of the solid laundry composition.

13. The water-soluble unit dose article according to claim 1 wherein the water-soluble film comprises a blend of polyvinylalcohol polymers and/or polyvinylalcohol copolymers.

14. The water-soluble unit dose article according to claim 13 wherein the water-soluble film comprises a blend of polyvinylalcohol polymers and/or polyvinylalcohol copolymers selected from sulphonated and carboxylated anionic polyvinylalcohol copolymers.

15. The water-soluble unit dose article according to claim 1 wherein the water-soluble unit dose article comprises at least a first compartment and a second compartment.

16. The water-soluble unit dose article according to claim 15 wherein the water-soluble unit dose article comprises at least a first compartment, a second compartment and a third compartment.

17. The water-soluble unit dose article according to claim 15 wherein the compartments are arranged in a side-by-side arrangement, a superposed arrangement or a mixture thereof.

18. The water-soluble unit dose article according to claim 16 wherein at least the second compartment, the third compartment or both comprise a liquid.

19. A method of washing comprising the steps of adding the water-soluble unit dose article according to claim 1 to sufficient water to dilute the solid laundry detergent composition by a factor of at least about 300 fold to create a wash liquor and contacting fabrics to be washed with said wash liquor.

20. A water-soluble unit dose article comprising a water-soluble film and a solid laundry detergent composition, wherein the water-soluble film defines a first internal compartment; and
   wherein the solid laundry detergent composition is comprised within the first internal compartment; and
   wherein the solid composition comprises a non-soap anionic surfactant; and
   wherein the solid laundry detergent composition has a bulk density of between about 400 and about 1000 g/l; and wherein the solid composition at about 1 wt % dilution in deionized water at about 20° C. has an equilibrium pH in the range of from about 6.5 to about 8.8.

21. A water-soluble unit dose article comprising a water-soluble film and a solid laundry detergent composition, wherein the water-soluble film defines a first internal compartment; and wherein the solid laundry detergent composition is comprised within the first internal compartment; and wherein the solid composition comprises a non-soap anionic surfactant; and wherein the first compartment comprises between about 1 g and about 25 g of the solid laundry composition; and wherein the solid composition at about 1 wt % dilution in deionized water at about 20° C. has an equilibrium pH in the range of from about 6.5 to about 8.8.

* * * * *